L. NIXON.
MILKING APPARATUS.
APPLICATION FILED SEPT. 19, 1919.
1,391,573.
Patented Sept. 20, 1921.
2 SHEETS—SHEET 1.
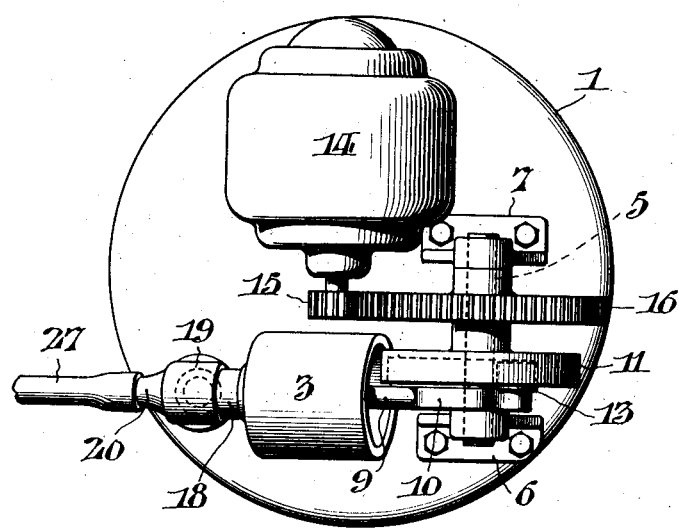
FIG. I.
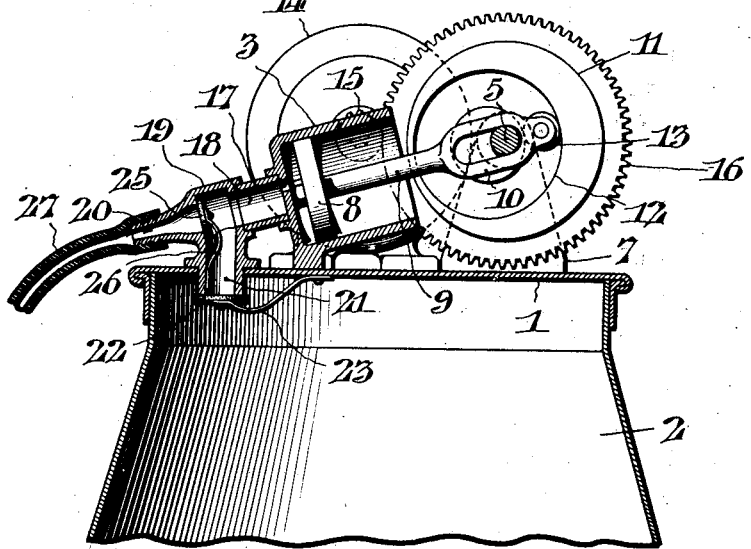
FIG. II.
WITNESSES:
John C. Bergner
James H. Bell
INVENTOR:
Leroy Nixon
BY
ATTORNEYS.

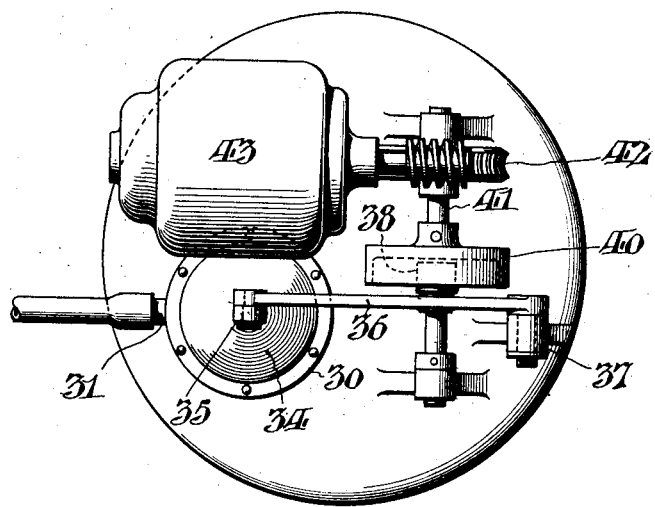
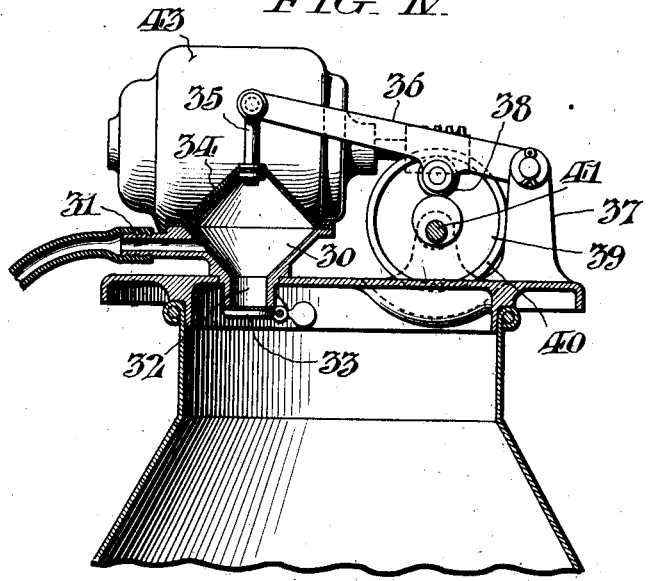

UNITED STATES PATENT OFFICE.

LEROY NIXON, OF MURRAY HILL, NEW JERSEY.

MILKING APPARATUS.

1,391,573.  Specification of Letters Patent.   Patented Sept. 20, 1921.

Application filed September 19, 1919. Serial No. 324,843.

*To all whom it may concern:*

Be it known that I, LEROY NIXON, a citizen of the United States, and a resident of Murray Hill, in the county of Union and State of New Jersey, have invented certain new and useful Improvements in Milking Apparatus, whereof the following is a specification, reference being had to the accompanying drawings.

The invention relates to milking apparatus of the type wherein the milk is drawn by the aid of a pulsating suction mechanism which is not only automatic in its operation, but whose principle of operation is such as to tend to effect a natural flow of the milk without any discomfort or harmful effects upon the producing animal.

The invention is directed to a milking device having the above general characteristics and in which the various constituent elements are grouped to form a complete unit and, to this end, preferably mounted upon a cover member universally applicable to the mouths of standardized receiving receptacles.

The invention is further directed to a pumping mechanism which produces suction and pressure alternatively or cycle-wise, so as to be pulsative in effect, and in which the periods of suction are of comparatively greater duration than the intervening pressure intervals. In this way an easy gradual draft is effected upon the animal during the suction period and ample time afforded to facilitate the ready flow of the milk, without in any way interfering with the rapid disposal of the drawn quantity during the comparatively shorter pressure period of the cycle.

My invention lends itself readily to embodiment in various forms, of which two have been herein illustrated. These, and the structural features whereby I attain the ends above outlined will be best understood from the detailed description which follows.

In the drawings, Figure I, is a plan view of a milking apparatus, conveniently illustrating my invention.

Fig. II, is a sectional elevation of the same.

Figs. III, and IV, are illustrations similar to the preceding, of a slightly modified form of my invention.

The various elements comprised by my invention are so grouped as to constitute a complete milking unit, and to this end, are preferably mounted upon a cover adapted to fit over the mouth of a standard can or receptacle, within which the milk is to be stored. In the form illustrated in Figs. I, and II, the cover and the can are indicated by the numerals 1, and 2. The function of creating the requisite suction necessary in the process of automatic milking is, in this instance, vested in a pump consisting of a cylinder 3, secured to the top of the cover 1, and disposed at an angle so as to be in alinement with an operating shaft 5, supported for rotation, at a higher elevation, by bearing standards 6, and 7. Within the cylinder operates a piston 8, which is fixed to the end of a rod 9, the latter being supplemented by a yoked extension 10, fitting about the shaft 5, and functional in maintaining the proper co-axial alinement of the piston 8, with the cylinder throughout its reciprocatory movements. Reciprocation is effected through the instrumentality of a cam disk 11, fixed upon the shaft 5. Said cam has a groove 12, and is operative upon a roller 13, mounted upon the outer end of the yoke extension 10, of the piston rod 9.

Shaft 5, may be driven by any approved means, but in the present instance, I prefer to employ an electric motor 14, which is also rigidly secured to the top of the cover. A spur pinion 15, fixed upon the motor shaft meshes with a gear 16, on the operating shaft 5, adjacent the bearing standard 7, said pinion and gear serving as a reduction gearing for the drive of the cam 11 by the motor 14.

The cylinder 3, is communicative, through a port 17, with the branch 19, of a branch 18, of a three-way fitting 19, which comprises also a nipple 20, axially alined with the said branch and a discharge outlet 21, which protrudes through the cover 1, as best seen in Fig. II. The outlet 21, is controlled by a valve disk 22, which is normally held in closed position by a leaf spring 23, and the inner end of the duct through the nipple 20, is similarly provided with a valve disk 25, normally held against its seat by a spring 26. These valves are adapted for alternate action and the precise manner of their coöperation will be more clearly explained hereinafter.

To the nipple 20, is attached a trunk tube 27, leading to a series of terminals (not shown), to which teat cups are appended. Since such devices are well known in this art, their illustration in the present connection has been deemed unnecessary.

The operation of the above described form of my invention is as follows:

After the teat cups are properly applied, the device is set in motion. As the piston 8, is drawn outwardly, the suction created in the cylinder 3, causes the valve disk 25, to yield automatically against the tension of its seating spring 26, so that the milk is drawn through the tube 27, and into the fitting 19, the valve 22, being at the same time, held closed by the force of the suction. During the return stroke of the piston, the milk is forced out of the fitting, and discharged into the receptacle 2, through the outlet branch 21, of the fitting 19. During this period the action of the valve is reversed, i. e. the valve 25, is forced to yield while the valve 22, is maintained in its closed position. It is to be noted that by reason of the character of the operating cam disk 11, a substantial dwell occurs at the completion of the suction stroke of the piston, so that ample time is afforded to facilitate the ready flow of the milk. This is of particular importance in order to permit a gradual drawing of the milk from the animal under the force of the vacuum before expulsion into the receptacle.

Referring now to the modified form of the apparatus shown in Figs. III, and IV, it will be noted that the grouping of the constituent elements is similar to that shown in the previous form. In this instance, the suction-creating element is in the form of a diaphragm pump, consisting of a cup or bowl member 30, which is provided with the milk inlet 31, and an outlet 32, controlled by a valve 33. The flexible diaphragm 34, of the pump is coupled by means of a metallic connector 35, to the outer end of a lever 36, fulcrumed to a bracket 37, preferably integrally formed with the cover. Intermediate its ends, said lever carries a roller 38, which is adapted to run within the groove 39, of a cam 40. Said cam is fixed upon a driving shaft 41, actuated by means of a worm gear 42, from the motor 43. In this case as in the former, the operative effect induced by the cam upon the pump is such as to cause a substantial dwell upon the suction stroke for the special purpose already understood. The character of operation in this instance, is otherwise precisely the same as in the previous consideration, so that further description thereof is deemed unnecessary.

Having thus described my invention, I claim:

1. A milking apparatus, including in combination, a motion pump and adjunctive appurtenances whereby the same is connected to the animal to be milked; a piston for said pump; and a rotary cam for reciprocating said piston, said cam being so shaped as to cause the piston to dwell at the end of its suction stroke.

2. A milking apparatus, including in combination, a suction pump and adjunctive appurtenances whereby the same is connected to the animal to be milked; a piston for said pump; a driving shaft; a connecting rod for said piston having a yoked extension embracing said shaft and adapted to maintain the piston and cylinder in alinement; and means for translating the rotation of said shaft to effect reciprocation of the piston rod.

3. A milking apparatus, including in combination, a suction pump and adjunctive appurtenances whereby the same is connected to the animal to be milked; a piston for said pump; a driving shaft; a connecting rod for said piston having a yoked extension embracing said shaft and adapted to maintain the piston and cylinder in alinement; a roller attached to said connecting rod; and a disk cam fixed to said shaft and coöperative with the roller in causing reciprocation of said rod.

4. A milking apparatus comprising, in a complete unit with its parts mounted on a receptacle cover, a suction pump having a cylinder and a reciprocating piston therein; a three-way suction and delivery fitting connected to said cylinder, discharging through said cover, and having a suction connection for milking; a rotary cam for reciprocating said piston with a dwell at the end of its suction stroke; and an electric motor driving said cam through a reduction gearing.

In testimony whereof, I have hereunto signed my name at Philadelphia, Pennsylvania, this 15th day of September, 1919.

LEROY NIXON.

Witnesses:
 JAMES H. BELL,
 E. L. FULLERTON.